May 6, 1969     H. R. BILLETER     3,442,165
TURNING FIXTURE FOR GENERATING POLYGONAL SHAPES
Filed Jan. 23, 1967     Sheet _1_ of 2
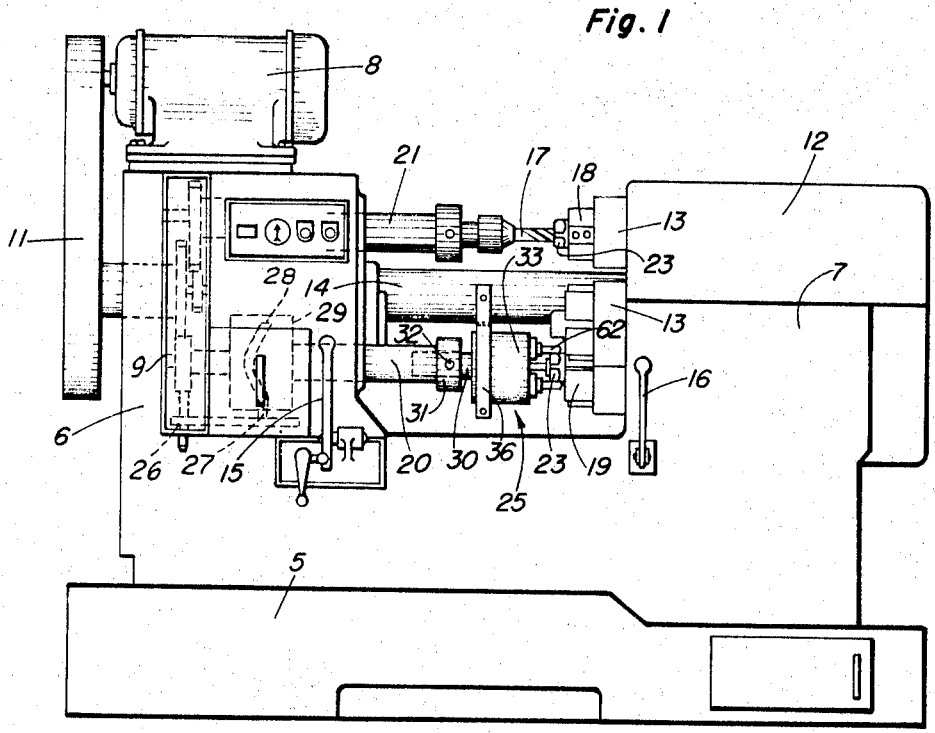
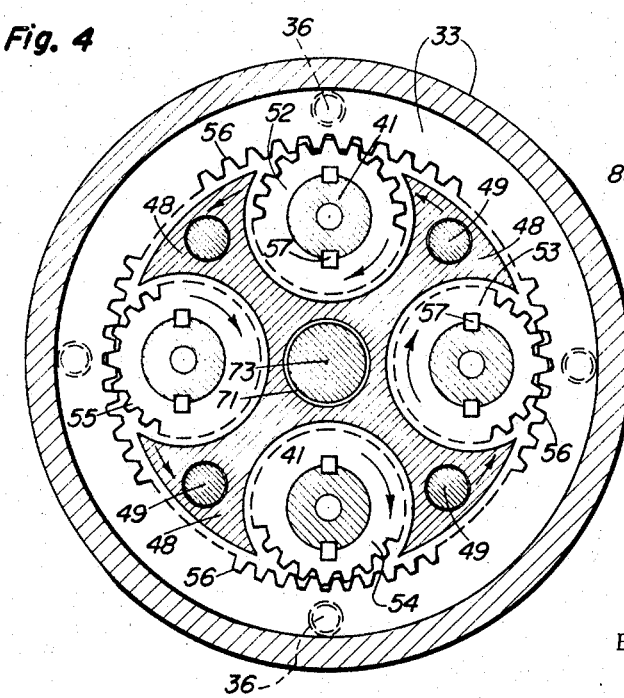
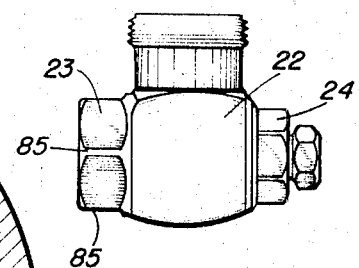
INVENTOR.
HENRY R. BILLETER
BY
PARKER & CARTER
ATTORNEYS

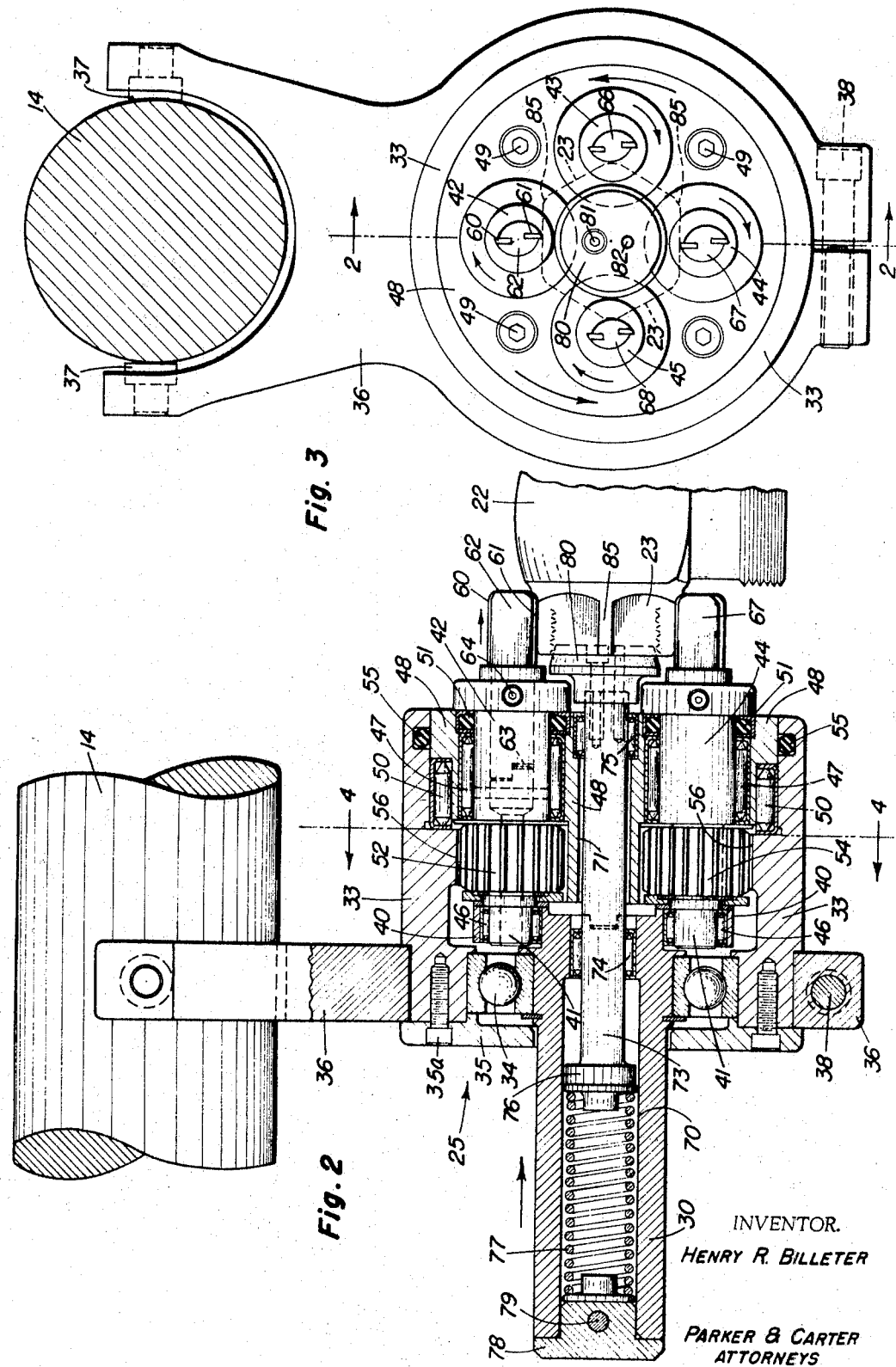

United States Patent Office 3,442,165
Patented May 6, 1969

3,442,165
TURNING FIXTURE FOR GENERATING POLYGONAL SHAPES
Henry R. Billeter, Deerfield, Ill., assignor to Sloan Valve Company, Chicago, Ill., a corporation of Illinois
Filed Jan. 23, 1967, Ser. No. 610,941
Int. Cl. B23b *3/28;* B23p *23/02;* B23c *1/14*
U.S. Cl. 82—18       9 Claims

ABSTRACT OF THE DISCLOSURE

This invention is concerned with a novel turning fixture for use in an automatic chucking machine for forming polygonal flat surfaces upon a valve body in which a series of cutting tools are rotated around a stationary held valve body.

Background of the invention

The invention is applicable to automatic chucking machines in which a workpiece is progressively indexed to different positions and at each position one or more operations are performed upon the workpiece such as drilling, tapping, shaping and milling. In one of the indexed positions the turning fixture is adapted to form flat hexagonal surfaces on the workpiece.

In known turning fixtures for producing flat surfaces it was customary to index a series of rotating workpieces into engagement with a revolving cutting tool and as the workpieces revolved the flat sides were formed. This method is exemplified in Patent 2,555,616, issued June 5, 1951, in which many operating elements, gearing and careful adjustment of the cutter tools was necessary. In addition considerable wear and tear on the driving equipment was experienced and the quality of the finished workpieces was not too good.

Summary of the invention

The novel turning fixture is supported upon and rotated by one of the main drive shafts on the automatic chucking machine. It includes a casing having an internal ring gear meshing with four spaced cutting tool gears to axially rotate the cutting tools around the valve body upon which six flat sides are to be cut. The cutting tools are oppositely disposed and progressively advanced to simultaneously cut flats on two opposite sides of the valve body. The intermediate cutting tools at the same time rotate idly between the flat positions. During the cutting operations the valve body is held stationary in its indexed position. A pilot shaft is spring pressed against the valve body to guide and hold the same during the cutting operation. During the time the hexagonal shape is being formed other operations may be performed at the same or different indexed positions of the machine. The flat sides are always formed in the same location on the valve body for the sake of uniformity. Better quality valve bodies are produced, total output per hour is increased, and wear upon the cutting fixture is reduced because of the employment of fewer parts and elements, over former types of turning fixtures.

In certain types of automatic chucking machines a number of different operations are performed simultaneously upon a workpiece, and because the workpiece in the present instance is held stationary in its indexed position, the turning fixture can operate at the same time to produce polygonal shapes while the other operations are taking place at the same indexed position on the workpiece.

The foregoing objects and other advantages not specifically enumerated and consisting in certain novel features and details of construction, combination, and arrangement of parts, will be apparent from the following detailed description of the invention and as set forth in the appended claims.

Brief description of the drawings

FIGURE 1 illustrates a side view of an automatic chucking machine showing the novel turning fixture of the invention applied thereto;

FIGURE 2 is a cross-sectional side view of the novel turning fixture taken generally along the line 2—2 of FIGURE 3;

FIGURE 3 is an end view of the turning fixture showing the cutters;

FIGURE 4 is a cross-section of the fixture taken generally along the line 4—4 of FIGURE 2, showing the cutter gears; while FIGURE 5 is a valve having hexagonal nut surfaces formed on it made according to the novel fixture of the invention.

Description of the preferred embodiment

While the invention is applicable for use in many different types of well known automatic chucking machines, it lends itself particularly well to such machines as the Model #65 New Britain Automatic Chucking Machines and other multiple spindle machines in which the workpieces are arranged to be progressively worked upon at different indexed positions with different tools. Certain of the multiple spindle chucking machines are designed to perform several different operations simultaneously upon a work piece each from a different direction, and at a single indexed position. The present turning fixture is adaptable to producing the polygonal flat sides on the same workpiece at the same time that the other operations are being performed upon it. This is possible because the workpieces are held stationary in each of its indexed positions. Since the detailed construction and operation of these machines are generally well known to those skilled in the art, it has not been thought necessary to illustrate or describe all the detailed elements or operating features, except as they affect the operation and association of the elements with which the present invention is concerned.

Referring to the drawings, FIGURE 1 shows a front view of an automatic chucking machine which generally includes a supporting base 5 enclosing a chip conveyer and having vertical side enclosures and supports 6 and 7. An electric driving motor 8 for the machine is mounted on support 6 and is adapted to drive a series of gears located within the power box 9 by means of a suitable enclosed drive belt 11. The gears within the power box 9 are arranged to operate the various elements of the machine. On the right hand end of the machine the indexing gear mechanism is located within the enclosure 12 for positioning the work holding spindle carriers 13. The drive shaft for this mechanism passes axially through the tool guide sleeve 14 from gear box 9 to the side enclosure 7. Manual control of the chucking machine is provided by the clutching lever 15 which connects the driving motor 8 with the gearing 9 and thereby controls the various tools, and the manual indexing lever 16 for controlling the manual indexing of the spindle carriers 13.

As is the usual practice in chucking machines, the tool slide 14 may guide and support a number of tools or fixtures, each of which is adapted to rotate and perform a different operation of the work pieces held in the different indexed positions of the spindle carriers 13. For the purposes of exemplification, a drill speeder 17 has been shown operating on a work piece 23 supported by a chuck 18 in one of the several positions of the spindle carriers 13. The spindle carriers 13 support an additional number of similar chucks, all of which have not been shown in the drawing for purposes of clarity. The spindle carriers 13 are adapted to be rotated and index the work pieces so as to carry them into each of the different positions. Also in the present instance, the drive shafts such as 20 and 21 extending from the gear box 9 and corresponding to the number of spindle or work holding chucks such as 18, are arranged to rotate the various cutting tools and to advance them into operative relationship with the work pieces.

The foregoing describess generally a chucking machine of the type to which the invention may be applied and to point out that a number of different operations may take place simultaneously on a work piece at the same time that the special turning fixture is performing its operations of producing polygonal shapes. The novel fixture indicated generally at 25 presents many advantages when applied ot the above automatic chucking machines since the cutting or turning of flat surfaces or polygonal shapes takes place simultaneously along with drilling, tapping, shaping, etc. Considerable labor and time are thereby conserved resulting in economies in cost of mass production of the work pieces. An example of an object or shape adapted to be worked upon by the turning fixture 25 of the invention is shown in FIGURE 5. This is a hollow brass valve body 22 having a hexagonal shaped inlet 23 for the purpose of applying a wrench to turn the valve on a pipe. On the opposite end there is another hexagonal shaped portion on the bonnet 24 of the valve which is made separately on the chucking machine and is threaded into the valve body 22. Other operations on the valve 22 such as tapping, boring, threading, and shaping are performed by the chucking machine in the various indexed positions, at the same time that the flat sides 23 are being milled by the novel fixture.

Referring now particularly to the FIGURES 1 and 2, the novel turning fixture 25 shown is adapted to mill the flat sides 23 to form a hexagonal shape upon the valve body 22 shown in partial elevation and section in FIGURE 2. When the body 22 is first indexed to the position shown, the blank end is of circular form and after it leaves this position and has the flat sides formed on it, it is indexed to the next position and another body takes its place. The turning fixture 25 is supported upon and driven by the main drive shaft 20 extending outward from gear box 9. A secondary drive shaft 30 on the fixture 25 extends axially into the main drive shaft 20 and is suitably keyed thereto and also locked in place on the main drive shaft 20 by the collar 31 and locking screw 32. The drive shaft 30 projects rearward from the hollow fixture casing 33 and is journaled in ball bearings 34 in the casing 33. The gear box 9 contains suitable gearing which is driven by the drive belt 11. This gearing, in addition to driving other elements of the machine, includes a gear driven shaft 26 having a dog 27 thereon which is adapted to ride in a cam feed groove 28 of the cam drum 29. This arrangement of parts in well known manner is effective to cause the fixture 25 of the invention to be advanced and retracted from engagement with the work piece 22 as it is being rotated. An end plate 35 is attached to the casing 33 by a series of bolts 35a to close off the rear end of the casing. A locating guide 36 for the fixture 25 straddles the tool slide 14 and has pins 37 in slidable engagement with the tool slide. The bottom end of the guide 36 encircles the casing 33 and is clamped thereto by the clamping screw 38 at the bottom end. By loosening the bolts 36, the whole fixture 25 may be axially shifted for the purpose of adjusting the proper position of the fixture with respect to the work piece spindles.

The secondary drive shaft 30 is provided at its forward end within the casing 33 with an annular flange 40 having four separate spaced apart bores therein to accommodate one bearing end 41 of each of four separate cutter spindles 42, 43, 44, and 45. Each cutter spindle end 41 is journaled in needle bearings 46 in the openings in flange 40 and the cutter spindles 42, 43, 44, and 45 are journaled in turn in needle bearings 47 suitably supported and arranged within four cutter spindle bores or openings arranged in the front spindle housing 48. This spindle housing 48 is bolted to and supported by a series of bolts 49 which thread into the flange portion 40 of the drive shaft 30. The bolts 49 as seen in FIGURE 3 are located between the four cutter spindles. It is apparent that with this construction, the spindle supporting housing 48 is rotatable along with the drive shaft 30 within the casing 33, and to provide smooth operation, needle bearings 50 are arranged between the casing 33 and spindle housing 48 as shown. An O-ring 55 seals the rotating surfaces between the spindle housing 48 and casing 33 while a suitable packing ring 51 seals the cutter spindles in the openings in spindle housing 48.

Each of the cutter spindles 42, 43, 44, and 45 are provided with a separate gear such as gears 52, 53, 54, and 55 respectively. These gears are keyed in known manner as by keys 57 shown in FIGURE 4, to the drive shafts 41 of their respective cutter spindles to rotate the same. The gears 52, 53, 54, and 55 are meshed with an internal ring gear 56 formed around the internal diameter of the casing 33. Each cuter spindle 42, 43, 44, and 45 is arranged to support a pair of cutter blades such as shown for example on spindle 42 which cutter blades 60 and 61 are recessed on opposite sides of a cutter supporting rod 62 extending within the spindle 42 and keyed in place by the lap connection 63. A set screw 64 serves to hold the cutting rod 62 firmly upon the spindle 42. Each of the other spindles 43, 44, and 45 are similary provided with cutting blades on opposite sides of their individual cutter shanks 66, 67, and 68.

Viewing the turning fixture 25 as seen in FIGURE 3, the spindle housing 48 is adapted to be rotated in a counter clockwise direction carrying the cutter spindles along with it while at the same time, the individual cutter spindles are independently rotated in a clockwise direction while performing their cutting operation. The secondary drive shaft 30 has an axial bore 70 extending therethrough and the spindle housing 48 has a similar bore 71 to accommodate a pilot shaft 73 reciprocatable within the two bores. Suitable needle bearings 74 and 75 enable the drive shaft 30 and spindle housing 48 to freely revolve around the pilot shaft 73 without turning it. The rear end of pilot shaft 73 has a collar 76 on it engaging one end of compression spring 77, the other end of which abuts a plug 78 held in place by a pin 79 extending through the plug 78 and the drive shaft 30. The spring 77 continuously urges the pilot shaft 73 forwardly. The forward end of pilot shaft 73 is provided with a pilot head 80 tapered at the front end and keyed rigidly to the end of pilot shaft 73 by a bolt 81 and pin 82.

*Operation of the turning fixture*

The particular apparatus, elements, and their association having been described, the operation of the polygonal turning fixture 25 will now be pointed out. Assume that in one of the indexed positions of the spindle carrier 13 of FIGURE 1, the chuck 19 is accessible for the workman to place the valve shown in FIGURE 5 into the jaws (not shown) of the chuck so that the valve is securely held in place and cannot rotate during the entire series of operations performed upon it. Assume next that the valve body 22 is moved into an indexed position in which a cutting tool (not shown) first milled the annular external diameter of the end of the valve body 22 upon which the flats 23 are to be milled. This produced a rounded end, portions of which are indicated at 85 between the flats 23 after the flats had been made, as will be pointed out. These six rounded portions 85 are indicated in the phantom view of the end of the valve in FIGURE 3. The chuck 19 is next indexed to a position directly opposite the position in which the turning fixture 25 is located. The main drive shaft 20 then operates automatically to progressively advance the turning fixture 25 forward and at the same time rotates the secondary drive shaft 30 as well as the spindle carrier 48 in a counter clockwise direction at a rotary speed of 400 r.p.m. As a result, the four cutter gears 52, 53, 54, and 55 are rotated by the ring gearing 56 in a clockwise direction but at a speed of 1200 r.p.m. Simultaneously the pilot shaft 73 is extended to its fullest distance from the front of the fixture and as the revolving fixture and cutters are progressively advanced, the pilot shaft head 80 eventually encounters the inlet opening of the valve 22 to center the guide the same into proper cutting position in the fixture, ready to commence the cutting operation.

As viewed in FIGURE 3, the cutter tools 60 and 61 are axially revolved by the tool holder 62 and moved by the spindle carrier 48 to the left to cut a thin chip across the top flat 23 of the valve. At the opposite or bottom side of the valve, a similar action takes place with the tool holder 67 rotating its cutters to the right and across the end of the bottom flat and also cutting a chip thereof. During the aforesaid action, the cutting tool holders 66 and 68 on opposite sides of the valve body and between the tool holders 62 and 67 are rotating idly across the rounded portions 85 and between the flats 23 being cut. As the turning fixture gradually advances, the cutters will form the six complete flat surfaces 23 upon the rigidly held stationary valve body 22. The pilot shaft 73 also gradually recedes into bore 70 compressing the spring 77 so that the work piece is accurately held and continuously guided into position as it is being worked upon by the cutting tools. When the cutting of the flat hex surfaces 23 is completed, the machine withdraws the fixture 25 from the work piece so that the work piece can be indexed to the next position for further operations upon it if necessary, and the following work piece moved to the position where the fixture can operate upon it. The output of finished valve bodies from the chucking machine is of the order of about 300 per hour.

An important advantage in the present method of turning the polygonal or hex sides on the valve body is that the flats are always made or produced in the same relative on the valve body so that all bodies are uniformly formed and shaped. When multiple installations of the valves are subsequently made, they will all present the same appearance and installation will be facilitated. Furthermore subsequent operations upon the valve made by the chucking machine in order indexed positions can be more readily accommodated for and a better product is produced.

From the foregoing description, it will be seen that there has been designed a novel fixture and mechanism for cutting flat sides on irregular shaped objects placed in an automatic chucking machine, and simultaneously have various other operations performed on them in the several indexed positions of the machine, and while only a single embodiment of the invention has been illustrated and described, it will be understood that other variations of the same may be evolved by those skilled in the art. It is therefore desired that the invention be not limited to the precise disclosure but only to the extent of the appended claims.

What is claimed is:

1. In a turning fixture for use on an automatic chucking machine in which the chucking machine is arranged to index a work piece into a position opposite said fixture and then non-rotatably hold the work piece in said indexed position while it is being worked upon;
   a fixture casing,
   a rotatable tool holding spindle in said casing in axial alignment with the work piece,
   a plurality of cutting tools disposed around said tool holding spindle and supported in said casing with their cutting edges projecting from said tool holding spindle,
   driving means for rotating said tool holding spindle at a predetermined speed to rotate said cutting tools, about the axis of said work piece,
   gear means for individually rotating said cutter tools at a different predetermined speed,
   a fixed ring gear in said fixture casing meshing with said cutter tool gears for driving the same,
   and means in said chucking machine for progressively moving said turning fixture towards said work piece whereby said cutting tools are advanced along the sides of said work piece to form flat sides thereon,
   two of said cutting tools arranged to simultaneously cut the flat sides on opposite sides of said work piece.

2. In a turning fixture for use in an automatic chucking machine in which the chucking machine indexes a work piece into a position opposite said fixture and then non-rotatably holds the work piece in said indexed position while it is being worked upon, said turning fixture comprising:
   a fixture casing having,
   a rotatable tool holding spindle therein arranged in axial alignment with the work piece,
   a plurality of cutting tools supported in and disposed around said tool holding spindle with their cutting edges projecting outwards toward said work piece,
   an annular ring gear around the interior of said casing,
   a driving gear for each of said cutting tools meshing with said ring gear for rotating said cutting gears,
   said tool holding spindle rotating at a predetermined speed in one direction and said cutting tools at another speed in another direction,
   a main driving shaft for rotating said cutting tool gears about said ring gear to cause said cutting tools to rotate about said work piece axis,
   and driving means in said chucking machine for progressively advancing said turning fixture towards said work piece whereby said cutting tools cut flat sides on said work piece,
   each cutting tool operating to cut one flat at a time while a cutting tool on the opposite side of said work piece is performing a similar operation.

3. In a turning fixture for use in an automatic chucking machine which machine is adapted to index a circular work piece into a position opposite the turning fixture and hold the same in non-rotatable relationship with said turning fixture while the work piece is being operated upon to produce hexagonal flat sides thereon, said turning fixture including:
   a casing having a rotatable tool holding spindle therein in axial alignment with the work piece,
   a plurality of cutting tools supported in and arranged in spaced relationship around said tool holding spindle,
   an annular ring gear around the interior surface of said casing,
   an individual driving gear for each cutting tool meshing with said ring gear,
   a main drive shaft in said turning fixture controlled by said chucking machine for rotating said tool holding spindle to cause said ring gear to rotate said cutting tool gears,
   said tool holding spindle and said cutting tools rotating in different directions and at different predetermined rotational speeds,
   means in said chucking machining for progressively advancing said turning fixture towards said circular work piece so that said cutting tools cut the flat sides therein,
   each cutting tool having two blades which rotate and advance across said work piece to produce a flat side thereon,
   the cutting tool directly opposite said first cutting tool performing a similar operation at the same time on the opposite flat side,
   the cutting tools between said first two cutting tools rotating idly at the same time as the portions of the work piece between the flats without cutting the same,
   and means for withdrawing said turning fixture after said hexagonal nut has been cut on said work piece.

4. In a turning fixture for use in an automatic chucking machine which machine is adapted to index a circular shaped work piece into a position opposite the turning fixture and hold the same in non-rotatable relationship therewith while the work piece is operated upon by said turning fixture to produce a hexagonal nut shape on the work piece, said turning fixture including:
- a casing having a rotatable tool holding spindle therein arranged in axial alignment with said work piece,
- at least four cutting tools supported around said tool holding spindle in spaced relationship with one another,
- an annular ring gear around the interior diameter of said casing,
- a separate driving gear for each of said cutting tools meshing with said ring gear,
- a main drive shaft on said turning fixture controlled by said chucking machine for rotating said tool holding spindle to cause said cutting tool gears to revolve about said ring gear,
- said tool holding spindle and said cutting tool gears revolving in opposite directions and at different speeds,
- means in said chucking machine for progressively advancing said turning fixture and its cutting tools against said work piece to cut the hexagonal flat sides thereon,
- two of said cutting tools being disposed directly opposite one another and simultaneously cutting opposite flats on the work piece as the cutting tools are being rotated around the work piece by said tool holding spindle,
- the other two cutting tools being disposed between said first two cutting tools and rotating idly between the flats being cut,
- each of said cutting tools being provided with oppositely arranged cutting edges,
- and means for retracting said turning fixture after the hexagonal flats have been cut on the work piece.

5. The turning fixture as claimed in claim 4 in which a pilot shaft projects axially from the turning fixture to engage the work piece to steady and guide the same during the turning operation.

6. The turning fixture as claimed in claim 4 in which a pilot shaft projects axially from the turning fixture to engage the work piece to hold and guide the work piece during the cutting operation;
- said pilot shaft being spring pressed against the work piece and being slidable within said main drive shaft and said tool holding spindle.

7. The turning fixture as claimed in claim 4 in which a pilot shaft extends axially from the turning fixture into engagement with the work piece to hold and guide the work piece during the cutting operation;
- said pilot shaft being spring pressed against said work piece and extending axially through said main drive shaft and said tool holding spindle,
- and sets of bearings between said pilot shaft, said main drive shaft, and said tool holding spindle.

8. The turning fixture as claimed in claim 4 in which the tool holding spindle revolves at a speed of 400 r.p.m. around the work piece;
- and the cutting tools each revolve at a speed of 1200 r.p.m. while cutting the flat surfaces.

9. The turning fixture as claimed in claim 4 in which the cutting tools cut each flat side on the work piece always in the same location on each work piece so that all work pieces present a uniform appearance.

References Cited

UNITED STATES PATENTS

| | | | |
|---|---|---|---|
| 1,485,687 | 3/1924 | Melling | 82—18 X |
| 2,530,502 | 11/1950 | Baney | 90—11 |
| 2,555,617 | 6/1951 | Swartz et al. | 29—38.2 |

FOREIGN PATENTS

| | | |
|---|---|---|
| 1,187,104 | 2/1965 | Germany. |

ANDREW R. JUHASZ, *Primary Examiner.*

G. WEIDENFELD, *Assistant Examiner.*

U.S. Cl. X.R.

29—38; 90—11, 15.1